US012775558B2

(12) United States Patent
Khasymski et al.

(10) Patent No.: US 12,775,558 B2
(45) Date of Patent: Oct. 27, 2026

(54) PROCESSOR CACHE ADJUSTMENTS FOR STORAGE PERFORMANCE

(71) Applicant: NetApp, Inc., San Jose, CA (US)

(72) Inventors: Aleksandr Sergeev Khasymski, San Jose, CA (US); Reyaz Ahmed, Fremont, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/181,747

(22) Filed: Apr. 17, 2025

(65) Prior Publication Data

US 2026/0329777 A1 Oct. 22, 2026

(51) Int. Cl.

*G06F 13/16* (2006.01)
*G06F 12/0871* (2016.01)
*G06F 12/0891* (2016.01)

(52) U.S. Cl.

CPC ...... *G06F 12/0891* (2013.01); *G06F 12/0871* (2013.01); *G06F 13/1673* (2013.01)

(58) Field of Classification Search

CPC ............. G06F 12/0891; G06F 12/0871; G06F 13/1673
USPC ........................................................ 711/118
See application file for complete search history.

(56) References Cited

U.S. PATENT DOCUMENTS

2014/0173221 A1* 6/2014 Samih ................. G06F 12/0804 711/143
2019/0042388 A1* 2/2019 Wang .................... G06F 12/084
2023/0143926 A1* 5/2023 Inbar ..................... G06F 3/0679 711/154
2024/0111459 A1* 4/2024 Biederman ........... G06F 3/0659
2025/0094350 A1* 3/2025 Roozbeh ............... G06F 9/5016
2025/0103397 A1* 3/2025 Herdrich ............... G06F 9/5005
2025/0147886 A1* 5/2025 Xue .................... G06F 12/0811

OTHER PUBLICATIONS

Intel Corporation, "Intel Data Direct I/O Technology (Intel DDIO): A Primer," Technical Brief, Revision 1.0, 11 pages, Feb. 2012.

* cited by examiner

*Primary Examiner* — Jared I Rutz
*Assistant Examiner* — Wei Ma

(57) ABSTRACT

Techniques and systems for enhanced storage system management are presented. In one example implementation, a method includes requesting pages each having physically contiguous space for buffering storage transactions issued for a set of storage drives managed by a storage application executed by the processor, and establishing space for the pages in a last level cache (LLC) of a processor. Based at least on monitored performance metrics related to the storage transactions, the method includes adjusting transaction buffers established within the pages that service each of the storage drives to modify a proportion of the LLC allotted among the transaction buffers and the processor.

20 Claims, 6 Drawing Sheets

PROCESSOR CACHE ADJUSTMENTS FOR STORAGE PERFORMANCE

BACKGROUND

Enterprise class storage systems can include large quantities of storage drives which are included in modular rackmount systems. These storage drives can be coupled in various architectures to storage controller nodes and to host nodes that serve data to/from client devices. The various elements can be coupled over a communication network or communication fabric. Many older storage architectures include use of fixed-configuration servers (e.g., blade servers) that can access storage drives over network links in generally static arrangements, while modern storage architectures can employ disaggregated arrangements. In these disaggregated arrangements, a relationship between host nodes and storage modules that include storage drives can be more flexible and dynamic. For example, any host node might be dynamically coupled to a set or storage drives to suit present workloads with an ad hoc communication fabric configuration scheme. Moreover, redundancy for storage drives and host devices can be established across these communication fabrics to form large, disaggregated storage clusters with high availability and high reliability.

In disaggregated storage clusters, for example, ensuring high availability and data integrity is desired. As such, various storage systems can be provided, some of which enable many individual storage drives to be accessible over network interfaces by remote nodes, such as client devices, other host nodes, users, and other remote entities. In these scenarios, the storage systems can include intelligent storage management software applications which instantiate storage volumes for remote access, handle data transfers and transaction monitoring, and manage operational and maintenance aspects of the storage drives distributed among a chassis or other arrangements.

However, as storage usage has increased in volume and capacity, the many individual storage transactions issued to storage drives can quickly saturate processors which host storage management software applications. This can be due to the increased flow of storage data to and from storage drives, which can require large quantities of main system memory (e.g., dynamic random-access memory, or DRAM) for such processors to hold read/write storage data. This increased usage of main system memory can create a memory bandwidth bottleneck, which can increase storage system cost, storage system power consumption, and restrict rates of data transfer between remote nodes and storage drives, especially in high-volume environments.

SUMMARY

Techniques and systems for enhanced storage system architectures, operations, management techniques, and software elements are discussed herein. These examples can employ the use of a last level cache (LLC) of a processor for buffering storage transactions instead of main system memory of the processor. Performance enhancements from such examples can reduce reliance on main system memory. This reduces cost, power consumption, and maintenance, while increasing performance of a storage system.

In one example implementation, a method includes requesting pages each having physically contiguous space for buffering storage transactions issued for a set of storage drives managed by a storage application executed by the processor, and establishing space for the pages in a last level cache (LLC) of a processor. Based at least on monitored performance metrics related to the storage transactions, the method includes adjusting transaction buffers established within the pages that service each of the storage drives to modify a proportion of the LLC allotted among the transaction buffers and the processor.

In another example implementation, an apparatus includes one or more computer readable storage media and program instructions stored on the one or more computer readable storage media. Based on being executed by a processing system, the program instructions direct the processing system to at least request pages each having physically contiguous space for buffering storage transactions issued for a set of storage drives managed by a storage application executed by the processor, and establish space for the pages in a last level cache (LLC) of a processor. The program instructions also direct the processing system to adjust transaction buffers established within the pages that service each of the storage drives to modify a proportion of the LLC allotted among the transaction buffers and the processor.

In yet another example implementation, a storage system includes a processor comprising a last level cache (LLC), and a storage application executed by the processor. The storage application is configured to request pages each having physically contiguous addressing for buffering storage transactions issued for a set of storage drives managed by the storage application, and establish space for the pages in the LLC using a Data Direct I/O (DDIO) function of the processor. Based at least on monitored performance metrics related to the storage transactions, the storage application is configured to adjust transaction buffers established within the pages that service each of the storage drives to modify a proportion of the LLC allotted among the transaction buffers and the processor.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
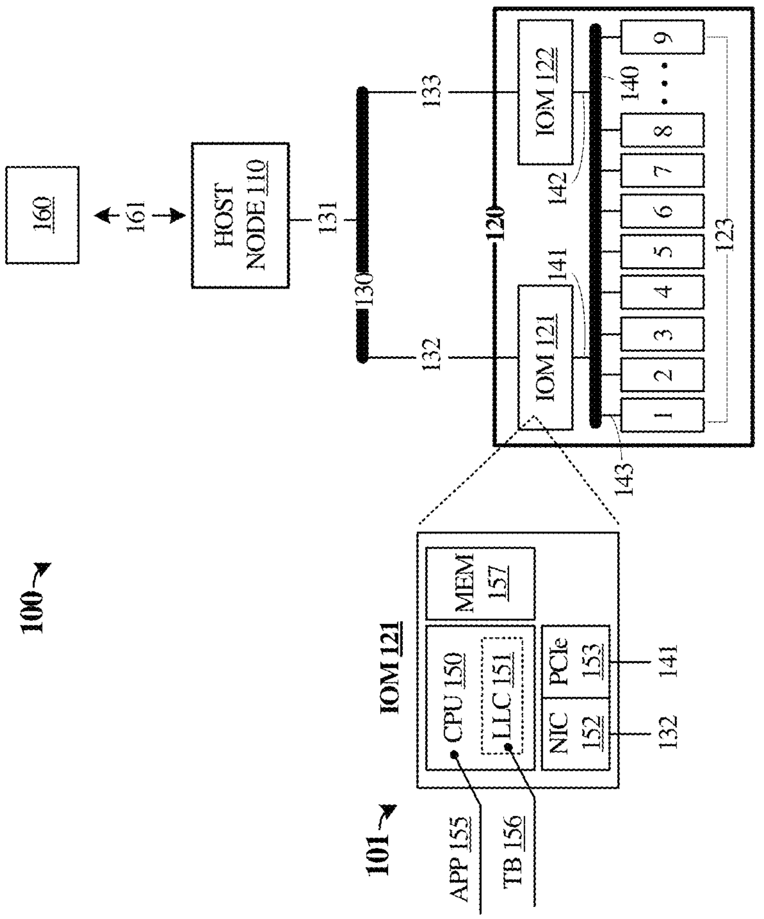
FIG. 1 illustrates an example storage environment in an implementation.

Techniques and systems for enhanced storage system architectures, operations, management techniques, and software elements are discussed herein. These examples can employ the use of a last level cache (LLC) of a processor for buffering storage transactions instead of main system memory of the processor. Performance enhancements can reduce reliance on main system memory to such an extent that the need for physically installed memory modules within a storage chassis can be reduced by half or more. This reduces cost, power consumption, and maintenance, while increasing performance of a storage system.

The term last level cache (LLC) is employed herein, and can refer to a cache memory employed by a processor for caching data, such as for a central processing unit (CPU) having one or more processing cores. An LLC can be positioned between a main system memory and a cache memory more proximate to a processor. The LLC can refer to the highest level of caching before main system memory (e.g., dynamic random-access memory, or DRAM), and is frequently deployed as a level-3 (L3) cache, although variations are possible. Typically, an LLC is shared among the processing cores of a processor and is divided by the processor into various logical subdivisions. These logical subdivisions include slices allocated on a per processing core basis, and the slices can be spread over physical address spaces in a proprietary distributed manner. For example, Intel-based processors can employ a hashing function to spread slices over the physical address space of an LLC.

Various implementations of the present technology provide for a wide range of technical effects, advantages, and/or improvements to computing systems and components. For example, various implementations may include one or more of the following technical effects, advantages, and/or improvements: 1) non-routine and unconventional operations reducing memory bottlenecks in storage systems, especially under high I/O workloads; 2) non-routine and unconventional operations for improved (or optimal) allocation of hardware resources to improve data transfer efficiency; 3) improved storage systems that dynamically control data transfer in unconventional ways through the use of a control application to dynamically configure (on a real-time or near real-time basis) use of a last level cache (LLC) of a processor; 4) improved system architecture that monitors I/O traffic characteristic and/or other system characteristics (e.g., L3 cache misses and memory bandwidth) enabling the system to dynamically provide active splitting and pipelining; 5) improved data storage system that uses unconventional and non-routine operations and components to maximize last level cache utilization thereby ensuring the system adapts in real-time to varying workloads and maintains optimal performance; 6) integration of a store and forward disaggregated storage application so that the application instructions and data as well as the store-and-forward buffer address are uniformly disturbed among cache slices and cache sets; 7) non-routine and unconventional operations for dynamic tuning of the number of store-and-forward buffers and their physical addresses; and/or 8) non-routine and unconventional operations to ensure no cache thrashing.

Turning now to a first example implementation, FIG. 1 is provided. FIG. 1 includes system 100 having a computing and storage cluster in one example configuration. This computing and storage cluster can be an example of a disaggregated computing or storage environment, fabric-coupled storage system, or other types of systems. While the discussions herein can employ disaggregated storage systems and associated elements, it should be understood that these examples can apply to other types and architectures of storage systems, as well as the various network, storage, and data interface types and standards noted herein.

In disaggregated arrangements, logical arrangements between host nodes and storage modules that include storage drives can be flexible and dynamic. For example, any host node might be dynamically coupled to a set or storage drives to suit present workloads with an ad hoc communication fabric configuration scheme. Moreover, redundancy for storage drives and host devices can be established across these communication fabrics to form large, disaggregated storage clusters with high availability and high reliability. Typically, a disaggregated cluster management node (not shown) can arrange various computing, storage, network, processing, and interfacing elements into arbitrary and dynamic collections that are communicatively coupled over a switched communication fabric. This fabric might be configured to provide logical isolation in the communication fabric among the elements within a collection, and this logical isolation can be changed on-the-fly to suit computing needs during operation. For example, a selected quantity of storage drives might be configured to be assigned to a selected quantity of host nodes.

The example in FIG. 1 shows one such example collection of elements which includes a host node that might communicate with one or more client nodes, a storage module having one or more storage drives, and a storage controller or input/output module (IOM), referred to as an IOM herein. More than one IOM can be included for redundancy and assigned to handle or manage the same set of storage drives. Also, more than one host node can be included in the collection of elements to provide for redundancy and monitoring of peer nodes. Various network or fabric interfacing elements can also be included, such as fabric communication interfaces and client communication interfaces.

Turning now to the elements of FIG. 1, system 100 includes host node 110, storage 'shelf' 120, and client node 160. Storage shelf 120 includes IOMs 121-122, and storage drives 123. A different quantity of host nodes, storage shelves, and storage drives can be included, although one (1) host node, nine (9) storage drives, and one (1) storage shelf are shown in FIG. 1 as an example. In addition, host node 110 communicates over associated communication link 131 coupled through a switchable communication fabric 130 to storage shelf 120 over links 132-133, although variations are possible. Client node 160 can communicate over link 161 with host node 110. IOMs 121-122 can redundantly communicate with any among storage drives 123 over links 141-143.

Also shown in FIG. 1 is detailed view 101 of IOM 121. IOM 121 includes central processing unit (CPU) 150 which further includes last level cache (LLC) 151, network interface controller (NIC) 152, and peripheral component interconnect express (PCIe) interface 153. NIC 152 can communicate over link 132, such as with client or host nodes over a network interface. PCIe interface 153 can communicate over link 141 with various storage drives, which might employ various fabrics, protocols, or standards of communication, including NVM Express (NVMe), among others. In addition, NIC 152 and other peripherals might communicate with CPU 150 by coupling though PCIe interface 153.

The architecture illustrated in FIG. 1 includes a plurality of storage drives 123 which are managed by one or more storage controllers (IOMs 121-122) that also communicate with external nodes that can initiate storage transactions (or storage I/Os). CPU 150 can execute various software and associated program instructions, such as storage application (APP) 155, that handle/manage the storage transactions, among other functionality. Typically, storage transactions and associated read/write data are buffered by main system memory (mem) 157 of CPU 150, which can lead to performance bottlenecks and slowdowns. In contrast, the examples herein provide for enhanced operation of a storage system using LLC 151 by employing LLC 151 to hold storage transaction buffers, reducing the usage of main system memory 157 of CPU 150.

Figure 2:
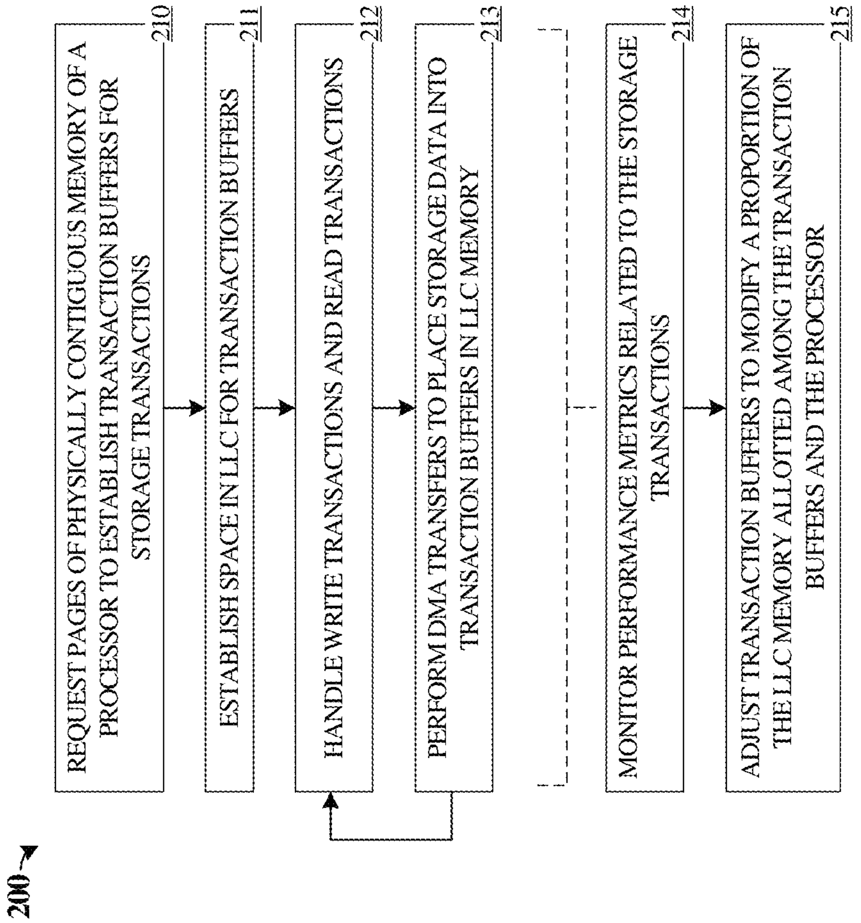
FIG. 2 illustrates example operations of a storage system in an implementation.

Example operations for elements of FIG. 1 are now discussed in operations 200 of FIG. 2. Operation 200 can include example operations for elements of system 100, but these operations can also be applied to other elements discussed herein. Also, a subset of operations 200 or a different ordering might be employed in other examples.

In operation 210, storage application 155 can request pages of physically contiguous memory associated with CPU 150 to establish transaction buffers for storage transactions. In some examples, CPU 150 can provide portions of a cache memory space for use by applications, instead of typical cache use as an intermediary memory space between only CPU 150 and main system memory 157. The physically contiguous memory can be requested as physical contiguous addressing for a memory space corresponding to main system memory 157. For example, the requested pages can include physically contiguous addresses within the memory space, such that the memory addressing is sequential within the requested portion.

Page sizes can also vary based on implementation, but in some examples the pages can comprise "huge pages," corresponding to a defined type of pages larger than a standard page size of a few kilobytes (KB). Sizes of huge pages include sizes on the order of megabytes (MB) or gigabytes (GB). So, in one instance, storage application 155 can request one or more huge pages from CPU 150, where the pages comprise physically contiguous addresses within each huge page. The requests are typically made at boot-up or startup of CPU 150, ensuring that page space is available. The huge page sizes are selected to accommodate a selected quantity of transaction buffers for handling storage transactions. For an example storage transaction size of 32 KB, the quantity of transaction buffers can correspond to the quantity of concurrent transactions supported by the corresponding storage drives (e.g., storage drives 123). If 32 concurrent transactions are supported per-drive, then 32 KB*32 is approximately 1 MB. This size can then be multiplied by the quantity of storage drives (e.g., 24 in some examples) to establish a total transaction buffer space requested by storage application 155. Additional overflow space can be requested to provide for burst transactions, beyond the metrics noted above.

In operation 211, storage application 155 can establish space in LLC 151 for the transaction buffers. Storage application 155 can request an amount of space dedicated to transaction buffers that meets or exceeds the space for pages requested in operation 210, so that the pages can fit within the requested cache space without eviction. The particular mechanism by which cache space can be requested can vary by manufacturer, processor model, and other factors. In certain Intel® processors, a Data Direct I/O (DDIO) function of the processor (Model Specific Register (MSR) 0xC8B) can be employed to request cache space of a last level cache (LLC 151) for direct use as communication buffers or by storage application 155. This DDIO function can provide for use of LLC 151 for communication interfacing buffering and other functions separate from the typical cache functions of CPU 150.

As noted above, the pages can be requested as having physically contiguous addresses. LLC cache structures can include logical arrangements, such as slices, which are apportioned on a per-core basis for CPU 150 and hashed across the space of LLC 151. Thus, when requesting physically contiguous addresses for the pages, storage application 155 can also ensure the pages span over a hashed sampling of slices in LLC 151, with a generally uniform spread over all slices by each page (or a selected subset of slices). This can help to distribute transaction buffers over all of the slices of LLC 151, which can provide performance increases as well as ensure an even use of the requested cache space among slices to limit or prevent evictions (from using too much of one particular slice versus another slice). Other page spanning or spread over slices can be employed, such as to bias cache usage for one or more slices.

LLC 151 can thus be divided into different logical "ways" which can be allotted to service general operation of CPU 150 and functions of storage application 155. The ratio, proportion, or allocation of the ways of LLC 151 can be dynamically apportioned to provide performance enhancements for storage transactions, functions of storage application 155, network interface operations (NIC 152), and storage drive buffering. Allocation of ways can be employed to differentiate among store-and-forward operations, a direction of the storage transaction (e.g., read/write), or the interface involved in a particular phase of a transaction.

Once the various cache spaces have been requested within LLC 151 and assigned to storage application 155, then storage application 155 can establish a plurality of storage transaction buffers (TB 156) that fit within LLC 151. Due in part to the pages having contiguous physical addressing, TB 156 can also be arranged to have contiguous physical addressing for each transaction buffer, such that (when cached) each transaction buffer is spread over slices, such as in a generally uniform manner across the slices of LLC 151. The sizes of individual transaction buffers can have an initial sizing, such as the 32 KB noted above, although variations are possible. In one example, individual transaction buffers are initially sized to match transaction sizes for read/write operations. Transaction buffers sizes can be later adjusted to match any changes to transaction sizes for read/write operations.

In operation 212, now that transaction buffers are established within the space of LLC 151, these can act as store-and-forward buffers for storage application 155 to handle write transactions and read transactions that are issued by nodes (110 or 160) with respect to storage drives 123. Store-and-forward buffers can employ direct memory access (DMA) style of transfers to get data into the transaction buffers from remote nodes ("store"), and then to transfer ("forward") this stored/buffered data to destination.

Read operations include obtaining a read request in storage application 155, such as read transaction issued by a remote node to retrieve data stored on one or more storage drives 123. The read request can include various identifiers for obtaining stored data, such as identifiers for storage addresses or locations, storage volume indicators, or authentication credentials, as well as destination location identifiers for a location/node to transfer the read data, and the like. Write operations include obtaining a write request, along with write data, in storage application 155, such as a write transaction issued by a remote node to write data into a storage location hosted by one or more storage drives 123. Write requests can include various identifiers as discussed for read requests, along with accompanying data to be written (write data).

In response to the read or write requests, in operation 213, storage application 155 performs transfers to place storage data into transaction buffers in LLC 151. For reads, this includes placing data read from one or more storage drives 123 into corresponding transaction buffers in LLC 151, and then transferring the buffered read data to a remote node. For writes, this includes placing write data for one or more storage drives 123 into corresponding transaction buffers in LLC 151, and then transferring the buffered write data to selected storage drives 123. As seen in FIG. 1, the remote nodes (110, 160) and storage drives 123 are coupled over different communication interfaces, namely NIC 152 and PCIe interface 153. The transaction buffers can be employed to buffer data received over NIC 152 before transfer over PCIe interface 153, and vice versa.

Over a period of reads/writes, in operation 214, storage application 155 monitors performance metrics related to the storage transactions. The performance metrics can include at least one among cache eviction rates of data corresponding to the storage transactions, cache thrashing for CPU 150, main memory bandwidth utilization rates, quantities of storage transactions, or sizes of the storage transactions, among other metrics. Cache eviction rates can indicate rates of data swapped to main system memory from LLC 151. High eviction rates can occur when not enough buffer space has been allocated in LLC 151 for storage transactions, leading to LLC 151 running out of cache space and forcing eviction of certain data to make room for incoming data or data swapped with main system memory. This condition can is not typically desired, and can lead to main memory bandwidth bottlenecks, among other slowdowns. Cache thrashing for CPU 150 can indicate when too little cache space has been allocated to operations of CPU 150 (apart from that allocated for storage application 155), leading to decreased CPU performance. Other metrics can have similar causes and effects, from too little cache space allocated to either CPU 150 or storage application 155.

In operation 215, storage application 155 can adjust the transaction buffers to modify a proportion of LLC 151 allotted among the transaction buffers and the processor. This adjustment can employ the vendor-specific operations noted above, e.g., DDIO functions, among others. As noted, the metrics can indicate when too little space within LLC 151 is allotted for either storage application 155 handling storage transactions and for general processing operations of CPU 150. The proportion of LLC 151 can be measured in cache 'ways' or other delineations employed by the specific cache architecture.

The dynamic allocation of portions of LLC 151 can modify a size of each transaction buffer or a quantity of transaction buffers, among other adjustments. These adjustments can affect the quantity of LLC 151 available to CPU 150 and to the transaction buffers. For examples where a fixed quantity of transaction buffers is employed (e.g., 32 transaction buffers per storage drive, 24 storage drives), changing a per-buffer size can affect the overall allocation of LLC 151 to transaction buffers. Increasing transaction buffer sizes, such as from 32 KB buffer sizes to 64 KB buffer sizes, can increase a transactional efficiency for the storage drives. However, too large of buffer sizes can reduce performance of CPU 150 in general, leading to less cache space for CPU operations and more evictions/thrashing for CPU 150. Conversely, reducing transaction buffer sizes, such as from 32 KB buffer sizes to 16 KB buffer sizes, can increase performance for CPU 150, by allocating less overall space in LLC 151 for storage transactions. However, reduced transaction buffer sizes can consequently reduce transactional efficiency for the storage drives, due in part to more transactions needed to move the same amount of storage data and potentially more evictions of buffered data to main system memory. Thus, a selected allocation is determined based on the operational metrics. This selected allocation can bias performance for CPU 150 or storage transactions, or can be selected to balance performance among the two purposes.

The allocation of LLC 151 can be denoted in a granularity of cache ways, N. Thus, LLC 151 can comprise an N-way associative cache structure. Storage application 155 can tune the number of store-and-forward transaction buffers and corresponding physical addresses in such a way that the transaction buffers only use 'M' of the N-way associativity of each set, where M<N. Storage application 155 can limit instructions and application data to the complement N-M ways, thus ensuring no cache thrashing. As mentioned, storage application 155 can monitor various system metrics like number of incoming storage transactions (I/Os) to the storage system, size of I/Os, memory bandwidth utilization, or other metrics, and dynamically scale M to maximize LLC utilization. Another example can scale M dynamically such that main system memory bandwidth is minimized, indicating that cache evictions are minimized for both CPU 150 and storage transaction buffering.

In one example, such as an initial configuration at boot-up of CPU 150, one-third (⅓) of the cache ways of LLC 151 can be allocated to CPU 150, while two-thirds of the cache ways of LLC 151 can be allocated to the transaction buffers for storage application 155. Adjustments from this baseline can occur dynamically according to the various metrics noted herein, among other considerations. These other considerations can include extrinsic factors, which might anticipate or preempt ongoing operations, such as when historical telemetry indicates a time of day that storage operations might reduce in quantity, or when a client node indicates that a burst of data is desired. These examples can temporarily alter the allocations in LLC 151 to accommodate a higher or lower volume of storage transactions, or a higher or lower performance need for CPU 150.

Returning to the elements that are found in system 100, client node 160 can comprise various endpoint devices or intermediate nodes configured to interface with one or more storage drives of system 100. Client node 160 can provide applications and other software environments for access to data storage units provided by storage drives 123, which can include operating systems, containerized software elements, user-level applications, client/server arrangements, data hosting operations, data server or data transfer nodes, and other various types of data or storage servicing elements. In some examples, client node 160 comprises processing circuitry, local storage devices, network interface elements, user interface elements, and other components that form various computing devices, servers, blade server modules, laptop computing devices, gaming devices, tablet computing devices, smartphone devices, data relay devices, virtualized servers, virtual machines, containerized systems, or other endpoint computing device, interworking node, or intermediary computing device.

Host node 110 can each include processing circuitry, such as one or more microprocessors, central processing units (CPUs), graphics processing units (GPUs), discrete logic, programmable logic devices, and other support circuitry and devices, such as memory devices, network interfacing elements, communication fabric interfacing elements, and user interface elements, among other elements. Host node 110 can be implemented as a single processing device, but instead may be distributed across more than one processing device or system that cooperates in executing program instructions. Host node 110 also can include various executable software configured to perform operations described herein, such as to provide storage system operations. In some examples, host node 110 components that form various computing devices, servers, blade server modules, laptop computing devices, gaming devices, tablet computing devices, smartphone devices, data relay devices, virtualized servers, virtual machines, containerized systems, or other endpoint computing device, interworking node, or intermediary computing device.

Storage shelf 120 can form a physical rack-mounted assembly, and comprises a chassis, sled, enclosure, housing, or other assembly element that can house circuitry of IOMs 121-122 and storage drives 123, among other elements, such as power supplies, monitoring circuitry, interfacing circuitry, fans, cooling elements, and other various components. Storage shelf 120 can be configured to removably couple to storage drives 123 for removal and insertion of modular data storage units. Storage shelf 120 can be further removably coupled into a storage or computing system, such as a midplane, backplane, rack, chassis, or other larger assembly which may include other iterations of storage shelf 120 and associated storage drives.

Storage shelf 120 can also include shelf fabric 140 and corresponding fabric links 141-143. Shelf fabric 140 can be a switched communication fabric comprising a collection of point-to-point links. Alternatively, a communication fabric might be omitted, and discrete storage links employed. For fabric examples, a Peripheral Component Interconnect Express (PCIe) fabric can be employed, which may include transport of various higher-layer storage interfacing protocols, including NVMe. In other examples, shelf fabric 140 can comprise connections, ports, or links that conform to various protocols and standards including FibreChannel, Compute Express Link (CXL), Gen-Z, InfiniBand, NVMe, NVM Express over Fabrics (NVMe-oF), NVLink, Cache Coherent Interconnect for Accelerators (CCIX), Compute Express Link (CXL), and Open Coherent Accelerator Processor Interface (OpenCAPI), among others. When PCIe is employed, various versions or generations can be used, such as PCIe generations 3.0, 4.0, 5.0, 6.0, Gen-Z, and beyond. Also, DMA transfers can be supported over shelf fabric 140, which can be employed to move data to/from storage drives and LLC 151 via PCIe interface 153.

IOMs 121-122 can comprise storage controllers, storage nodes, or other storage handling elements which handle storage operations or transactions for a set of storage drives. Each among IOMs 121-122 can include elements represented by CPU 150, such as processing circuitry and cache elements, such as one or more microprocessors, central processing units (CPUs), system-on-a-chip (SoC) elements, application specific integrated circuits (ASICs), discrete logic, programmable logic devices, and other support circuitry and devices, such as memory devices, network interfacing elements, and communication fabric interfacing elements, among other elements. IOMs 121-122 can be implemented as a single processing device, but instead may be distributed across more than one processing device or system that cooperate in executing program instructions. IOMs 121-122 also can include various executable software configured to perform operations described herein, such as to provide storage operations for storage shelf 120, manage various storage drives, interface with external nodes for handling storage transactions, and perform various maintenance and administration tasks, including telemetry, monitoring, recovery, and other storage system operations.

Cache elements among CPU 150 can include layer-1, layer-2, layer-3, or other cache layers/levels, including last layer cache (LLC) 151, among the layers. Each cache layer can be implemented with one or more memory devices, which can be integrated on a semiconductor die with corresponding processing circuitry, or included in separate semiconductor portions. Memory interfaces can be included among the cache layers, and a main system memory interface can also be included to accommodate one or more modular random-access memory devices (RAM). CPU 150 can include various graphics processing elements, graphics interfaces, communication interfaces, network interfaces, as well as various software including operating systems, drivers, telemetry components, storage applications, other applications, and the like.

IOMs 121-122 can comprise storage controllers which can receive storage transactions, such as read transactions and write transactions over communication links, as transferred by host nodes or client nodes. Responsive to a read transaction, IOMs 121-122 can interface with one or more storage drives to read data from corresponding storage media as identified by the read transaction, and transfer the data for delivery to an associated node that originated the storage transaction. Responsive to a write transaction, IOMs 121-122 can interface with one or more storage drives to write data that accompanies the write transaction to storage media. IOMs 121-122 can implement various storage control schemes, such as wear leveling, striping, mirroring, error checking and correction, encryption/decryption, deduplication, partitioning, virtual volume handling, and other techniques.

Storage drives 123 each comprise storage media, drive interfaces, drive connectors, and data storage and handling circuitry. Example storage drives include solid state storage drives (SSDs) or hard disk drives (HDDs), although other mass storage devices can be employed. Storage media can comprise solid state storage media, such as flash memory, static RAM, NAND flash memory, NOR flash memory, memristors, or other solid state media. In other examples, each storage media can comprise magnetic storage, such as hard disk drive rotating media, magnetoresistive memory devices, and the like, or can comprise optical storage elements, such as phase change data storage. Drive interfaces can include PCIe, NVMe, Serial Attached SCSI (SAS), Compute Express Link (CXL), NVM Express over Fabrics (NVMe-oF), or other various storage drive or peripheral interfaces. Storage connectors can comprise a U.2 connector (SFF-8639), U.3 connector, M.2 connector (NGFF), M.3 connector, or Enterprise and Data Center Standard Form Factor (EDSFF) connector, MCIO connector, Next Generation Small Form Factor (NGSFF/NF1), among others.

Communication fabric 130 includes fabric ports which can couple to various nodes over associated fabric links 131-133, typically comprising point-to-point links. Communication fabric 130 can include various networks, communication fabrics, crosspoint switches, packet switching elements, controllers, distribution hubs, or other intermediary elements. In some examples, fabric ports and links include switched network connections compatible with Ethernet standards corresponding to wired or wireless connections, which can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless formats and speeds. In other examples, communication fabric 130 can comprise connections, ports, or links that conform to various protocols and standards discussed herein for fabric 140. Also, various higher-layer protocols can be transported by an Ethernet network, such as NVMe-oF or other storage protocols. When NVMe-oF is employed, NVMe-oF can comprise a network protocol which provides remote direct memory access (RDMA) over Ethernet networks instead of over directly-coupled PCIe links or PCIe fabrics.

Any of the links in FIG. 1 can each use various communication media, such as air, space, metal, optical fiber, or some other signal propagation path, including combinations thereof. Any of the links in FIG. 1 can include any number of nested links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

Figure 3:
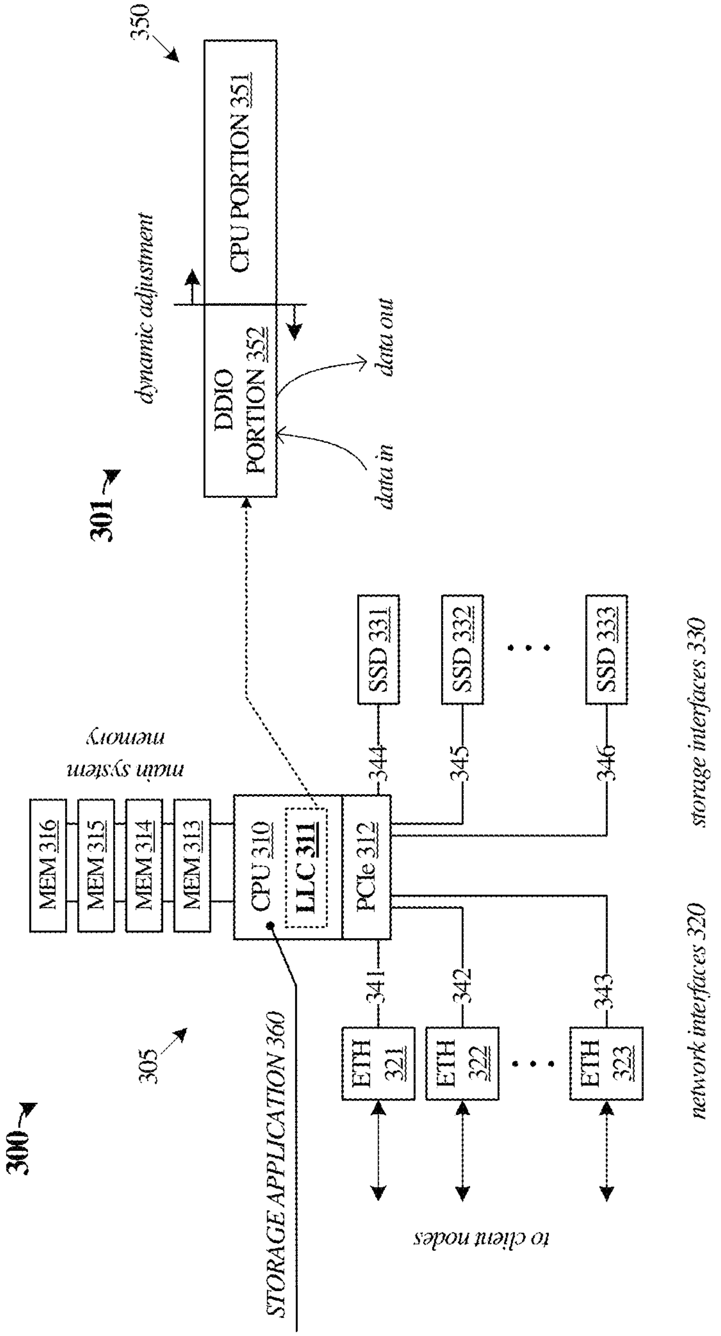
FIG. 3 illustrates an example storage node in an implementation.

FIG. 3 includes view 300, which illustrates storage node 305 in an example implementation. Storage node 305 can be an example of portions of storage shelf 120 in FIG. 1, although variations are possible. Storage node 305 includes CPU 310 which hosts storage application 360. CPU 310 includes last level cache (LLC) 311, as well as various memory interfaces and peripheral interfaces, including PCIe interface 312. CPU 310 employs memory modules 313-316 as main system memory, or RAM, which might comprise dynamic random-access memory (DRAM) of various types or speeds compatible with CPU 310. A plurality of network interfaces 320 are included, which can comprise Ethernet interfaces 321-323 provided by corresponding network interface controller circuitry over PCIe links 341-343. A plurality of storage interfaces 330 are included, which can comprise PCIe/NVMe links 344-346 coupling SSDs 331-332 to PCIe interface 312.

FIG. 3 also includes view 301 which shows example LLC arrangement 350 as one example state of LLC 311. LLC arrangement 350 can be adjusted to obtain selected performance from storage node 305. Although LLC 311 is shown within CPU 310 in FIG. 3, it can instead be a separate element, included on a same or different semiconductor die, or presented in another configuration. Also, although PCIe interface 312 is included as one example peripheral and data interface that communicates with various Ethernet interfaces and solid state storage drives (SSDs), other interfaces and arrangements can be included.

Figure 4:
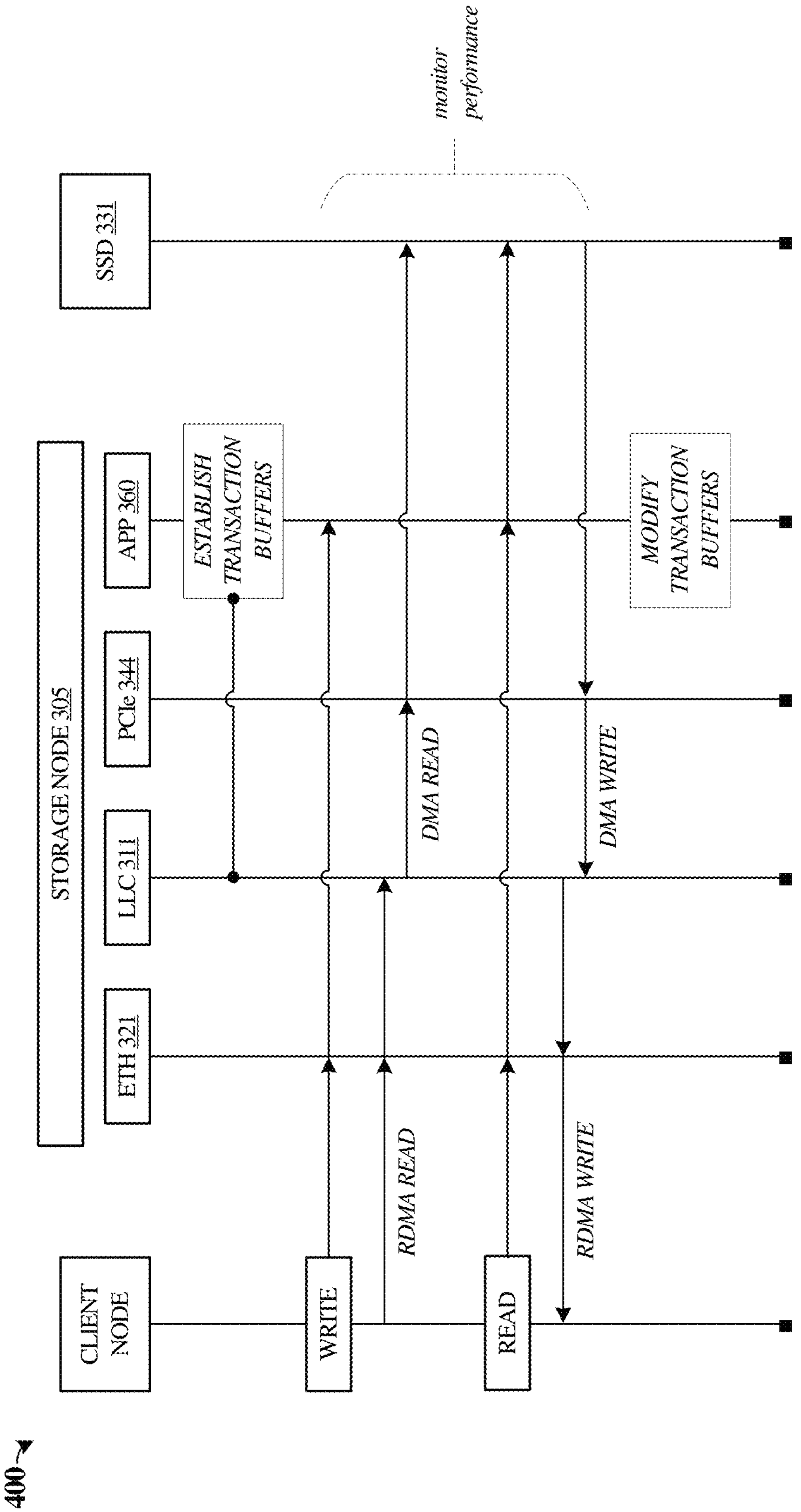
FIG. 4 illustrates an example operational flow of a storage system in an implementation.

FIG. 4 illustrates operational flow examples for storage node 305. In FIG. 4, a client node (not shown in FIG. 3) can issue read operations or write operations (I/O) with respect to one or more storage drives managed by storage node 305. However, before storage operations are serviced by storage node 305, various transaction buffering optimizations can be established by storage application 360 executed by CPU 310.

Storage application 360 can establish transaction buffers within LLC 311. In some examples, space for these transaction buffers can displace operational cache space for CPU 310. One mechanism by which space can be requested and assigned to storage application 360 is through processor-specific instructions or commands that can allocate a portion of LLC 311 for use by non-CPU functions. These functions include communication interface usage and application usage, among other functions. In certain Intel® processors, a Data Direct I/O (DDIO) function of the processor (Model Specific Register (MSR) 0xC8B) can be employed to request space within LLC 311 for direct use by storage application 360. This DDIO function can provide for use of LLC 311 for communication interfacing buffering and other functions separate from the typical cache functions of CPU 310.

Storage application 360 can request memory pages from CPU 310, which can correspond to pages having contiguous physical space within main system memory. However, the sizing of the pages and quantity of pages are selected to fit within the space requested (above) for use in LLC 311, so that the pages are cached therein during operation. Within the pages, storage application 360 can establish sets of transaction buffers assigned to each of the storage drives, with these transaction buffers having an initial buffer size corresponding to sizes of storage transactions.

As mentioned, each of the pages can be requested as having physically contiguous space, such as having physically contiguous addresses. Due in part to the hashing and/or distribution function employed by the CPU when establishing slices within the LLC, selecting the physically contiguous addressing can also act to spread the space of each page over more than one slice of the LLC. The spread can be uniform across all or a portion of slices, although other configurations are possible. The uniform distribution can provide more performant operation when buffering storage transactions, to not overwhelm or fill any particular slice and force evictions to main system memory. Also, the transaction buffers can be spread over more than one slice of the LLC according to the distribution function of the processor, similar to the pages, and can comprise physically contiguous address subsets within the pages. As mentioned, the physically contiguous addresses for the pages and the physically contiguous address subsets for the transaction buffers can be selected to obtain a spread generally uniformly among the cache slices.

Turning first to a write operation, a client node can issue a write request or write transaction to one or more storage drives managed by storage application 360. The client node can issue this write request over a network connection, network link, RDMA connection, NVMe-oF connection, or other various types of links and protocols that employ network connections. Storage application 360 can receive an indication of this write request, such as over Ethernet interface 321, which can be coupled to CPU 310 via PCIe interfere 312. Responsive to an indication of the write request initiated by the remote client node over the network link and directed to a selected storage drive, storage application 360 can begin transfer of the write data into the transaction buffers of LLC 311. Storage application 360 might designate a set of the transaction buffers for servicing write requests for a particular SSD, such as SSD 331. Storage application 360 can then use this set of the transaction buffers in LLC 311 to hold the write data in a store-and-forward arrangement before SSD 331 commits the write data to corresponding storage media. It should be understood that multiple SSDs can be involved in the write operation, but for purposes of example, only SSD 331 is discussed.

Storage application 360 can initiate a remote direct memory access (RDMA) read operation over network link 341 to transfer write data for the write request from the remote node into the set of the transaction buffers in LLC 311 designated to service the write request. This RDMA read operation reads from a memory associated with the remote node to obtain the write data, and the write request can indicate associated addressing and other parameters need to initiate and perform this RDMA read operation. Once the write data has been transferred into LLC 311, then storage application 360 can initiate a write operation to the selected storage drive comprising a direct memory access (DMA) read operation of the write data from the set of the transaction buffers into the storage drive, namely into SSD 331. In this instance, storage application 360 can inform SSD 331 that write data is ready for retrieval within LLC 311, using associated addressing that can access the write data in LLC 311. SSD 331 will then perform the DMA read over PCIe link 344 to obtain the write data from LLC 311 and transfer into a corresponding memory or buffer of SSD 331. SSD 331 can then write the write data to storage media of SSD 331. Once this write has completed, such as responsive to a notice of the DMA read completion from SSD 331, then storage application 360 can release the set of transaction buffers for use in other storage transactions.

Turning next to a read operation, a client node can issue a read request or read transaction to one or more storage drives managed by storage application 360. The client node can issue this read request over a network connection, network link, RDMA connection, NVMe-oF connection, or other various types of links and protocols that employ network connections. Storage application 360 can receive an indication of this read request, such as over Ethernet interface 321, which can be coupled to CPU 310 via PCIe interfere 312. Responsive to an indication of the read request initiated by the remote client node over the network link and directed to a selected storage drive, storage application 360 can inform the corresponding SSD of the read request, namely SSD 331 in this example. SSD 331 can then retrieve the read data from storage media of SSD 331 and transfer the read data into the transaction buffers of LLC 311. Storage application 360 might designate a set of the transaction buffers for servicing read requests for a particular SSD, such as SSD 331. Storage application 360 can then use this set of the transaction buffers in LLC 311 to hold the read data in a store-and-forward arrangement before transfer to the remote node that initiated the read request. It should be understood that multiple SSDs can be involved in the read operation, but for purposes of example, only SSD 331 is discussed.

SSD 331 can initiate a direct memory access (DMA) write operation over PCIe link 344 to transfer read data for the read request from SSD 331 into the set of the transaction buffers in LLC 311 designated to service the read request. This DMA write operation can indicate associated addressing and other parameters need to initiate and perform this DMA write operation into LLC 311. Once the read data has been transferred into LLC 311, then storage application 360 can initiate a write operation to the remote client node that initiated the read request, namely a remote direct memory access (RDMA) write operation over network link 341. Once this write has completed, such as responsive to a notice of the RDMA write completion from storage application 360 to the client node, then storage application 360 can release the set of transaction buffers for use in other storage transactions.

During one or more of these write operations and read operations noted above, storage application 360 can monitor performance of the write/read operations and performance of CPU 310, LLC 311, main system memory, and other performance parameters or metrics. Example performance metrics can comprise at least one among LLC 311 eviction rates of data corresponding to the storage transactions, cache thrashing of LLC 311 for operations of CPU 310, main system memory bandwidth utilization rates, overall quantities of storage transactions, or sizes of the storage transactions.

Based on these metrics, storage application 360 can perform dynamic adjustments to modify the transaction buffers. View 301 shows one example, where a portion 352 of LLC 311 is allocated to DDIO functions (i.e., storage transaction buffers), and a portion 351 of LLC 311 is allocated to CPU functions. These allocations can change according to the performance metrics noted above. For example, if a CPU performance metric is below a selected metric threshold, then the allocation of LLC 311 to portion 351 can increase. Conversely, if a storage transaction performance metric is below a selected metric threshold, then the allocation of LLC 311 to portion 352 can increase, namely adjusting the transaction buffers. Adjusting the transaction buffers can comprise adjusting sizes or quantities of the transaction buffers, where the adjusted sizes or quantities are selected to prevent main system memory access for buffering the storage transactions. Due to the finite amount of space within LLC 311, changing an allocation to one function can also correspondingly change the allocation to another function.

Furthermore, modern SSD architectures can incorporate multiple forms of data parallelism, such as channel and chip level parallelism. Using these techniques, a storage controller, such as storage node 305, can parallelize reads or writes (referred to as I/Os or storage transactions) by spreading the I/Os across NAND flash chips comprising the SSDs. Storage application 360 can determine a selected I/O size where acceptable parallelism is achieved by storage node 305. If overall incoming workload to a disaggregated storage system (I/O size and queue depth) exceeds available cache space, storage application 360 can start slicing incoming commands into child requests of the minimal size determined above. As child requests themselves are enough to take advantage of the parallelism in the SSDs, overall throughput does not decrease because of splitting of the incoming I/Os. However, if each child uses the same buffer in cache, then splitting greatly decreases cache requirements of the application. Splitting incurs a penalty in terms of instructions (i.e., extra code path to issue more I/Os need to the backend) and extra data structures needed to keep track of the child requests, both of which require extra LLC cache for storage application 360. Storage application 360 can monitor number and size of I/Os as well as LLC cache misses and main system memory (313-316) bandwidth utilization and enable splitting and pipelining only after incoming workload crosses a threshold T, where the benefits of splitting by reusing memory buffers for DDIO portions outweigh the penalty of the extra LLC space required to effectively manage the split child requests.

Figure 5:
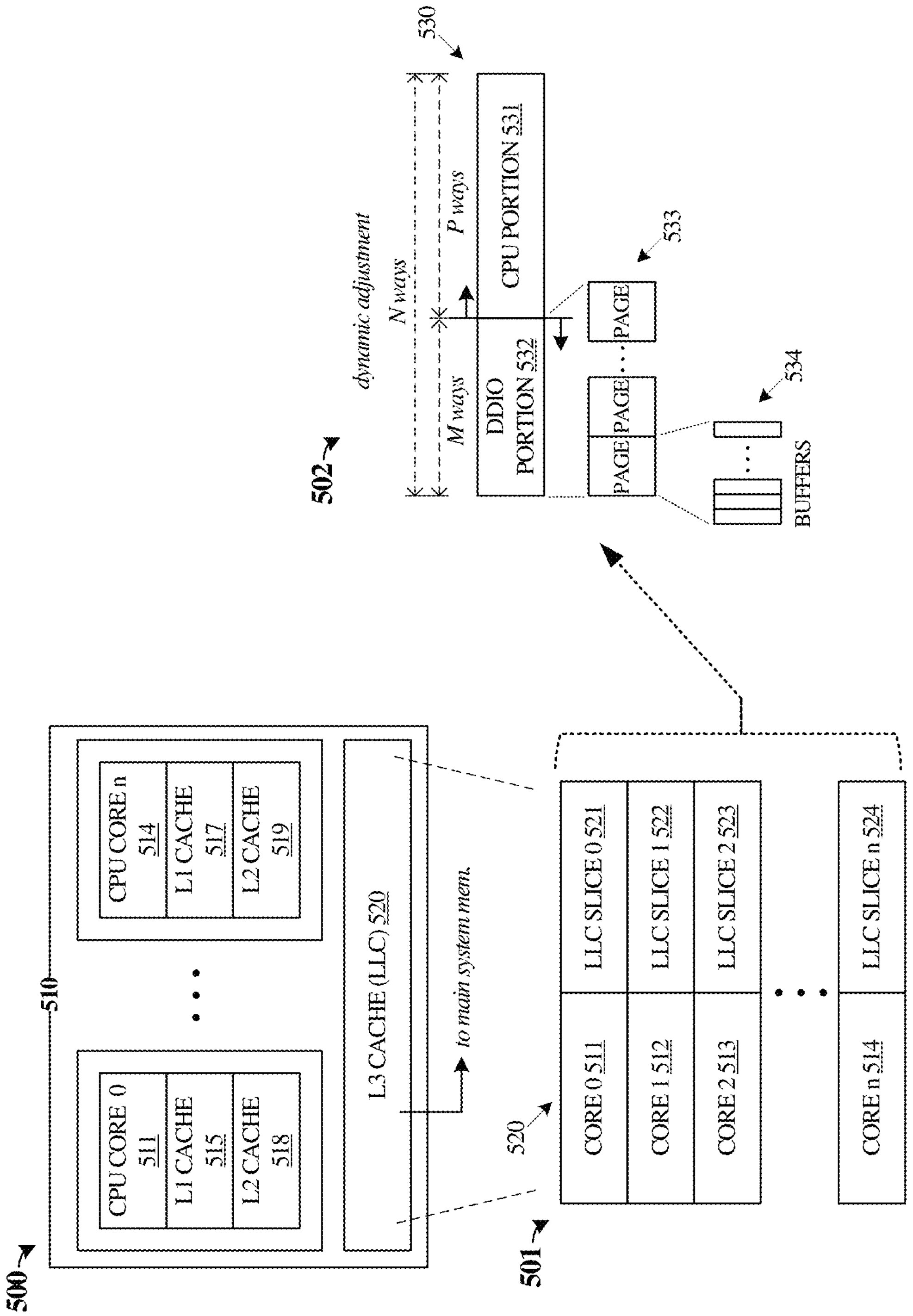
FIG. 5 illustrates an example cache architecture in an implementation.

FIG. 5 illustrates an example cache architecture in an implementation. View 500 illustrates a processor-level view of a central processing unit with corresponding processing cores and cache structure. View 501 illustrates a detailed view of one example arrangement of an LLC cache. View 502 illustrates dynamic adjustment of the LLC cache arrangement. The elements of FIG. 5 can be implemented in any of the example CPU and cache arrangements herein, although variations are possible.

Turning first to view 500, CPU 510 is shown having a plurality of processing cores, with CPU core 0 (511) through CPU core 'n' (514) shown as representative of such cores. The quantity and arrangement of cores can vary based on implementation, and some cores can be specialized for different tasks or power consumption targets. With each core, a layered cache arrangement is shown, with a level-1 (L1) cache (515, 517), level-2 (L2) cache (518, 519), and level-3 (L3) cache (520). In this example, the level-3 (L3) cache 520 is designated as the last level cache (LLC), which typically refers to the final cache layer before main system memory. LLC 520 is shown as shared among all cores of CPU 510, with a more detailed view included in view 501.

View 501 shows an example cache arrangement for a CPU having at least four cores, namely core 0 (511), core 1 (512), core 2 (513), and core 'n' (514). A different quantity of cores might be employed, each with a corresponding cache structure within LLC 520. In LLC 520, each core is allocated a portion of the space within LLC 520 as a corresponding slice, namely slices 521-524. Each slice can be employed by a core for caching operations. Slices correspond to a logical partitioning within LLC 520, and further underlying structure can be assigned for each slice, such as pages, cache blocks, cache rows, and the like. During operation of CPU 510, data can be placed into LLC 520 after eviction from a lower level cache (e.g., L2 cache) and also placed into LLC 520 from main system memory (i.e., prefetching operations).

While the slices are shown as a portion of LLC 520 that corresponds to each core, the physical arrangement of space within LLC 520 can vary. For example, all slices can be distributed throughout the space of LLC 520 according to a distribution or hashing function implemented by CPU 510. This may be in random or semi-random fashion, or in a different distribution, depending on the selected hashing algorithm. Thus, while the slices are shown in view 501 as being ordered according to each core, these slices will typically be distributed over the physical space provided by LLC 520.

In addition to using LLC 520 for caching operations of CPU 510 and associated cores, LLC 520 can be configured to share or allocate a portion of the space to other purposes, such as for applications executed by CPU 510 or one or more communication interfaces associated with CPU 510. In one example, network interfaces or PCIe communication interfaces can use a portion of LLC 520 for buffering data transfers. When properly configured, this configuration can reduce or prevent these data transfers from having to use main system memory, reducing bottlenecks of a shared memory bus, as well as increasing performance of the data transfers.

One example shared caching arrangement 530 is shown in view 502. In view 502, a CPU portion 531 is allocated to operations of the cores of CPU 510, such as noted in view 501 for slices 0-n assigned to cores 0-n. These portions can service data evicted from lower cache levels for each core (e.g., L2, L1) and hold pre-fetched data from main system memory, among other CPU cache functions.

Caching arrangement 530 also includes DDIO portion 532. During operation, DDIO portion 532 can cache a plurality of memory pages which might comprise a sub-portion of the total DDIO portion. Page size can vary, but typical page sizes include 4 KB (4096 bytes) sizes. Large pages can be requested from LLC 520, including the huge page designation. Huge pages can be 2 MB, 1 GB, or other sizes, depending on implementation. This DDIO function of LLC 520 can provide for communication interfacing buffering and other functions separate from the typical cache functions of CPU 510.

In one instance, a storage application can request one or more huge pages 533 from CPU 510, where pages 533 comprise physically contiguous addresses within each huge page. The huge page sizes are selected to accommodate a selected quantity of transaction buffers 534 for handling storage transactions, and to fit within the requested DDIO portion 532. For an example storage transaction size of 32 KB, the quantity of transaction buffers can correspond to the quantity of concurrent transactions supported by the corresponding storage drives. If 32 concurrent transactions are supported per-drive, then 32 KB*32 is approximately 1 MB. This size can then be multiplied by the quantity of storage drives (e.g., 24 in some examples) to establish a total transaction buffer space requested within LLC 520. Additional overflow space can be requested to provide for burst transactions, beyond the metrics noted above. This overflow space can be sized to accommodate the anticipated or supported sizes of burst transactions, such that even when burst transactions are performed, the buffer space within LLC 520 is sufficient to hold associated read/write transactions.

The pages can be requested as having physically contiguous addresses. As noted, slices 0-n are apportioned on a per-core basis for CPU 510 and hashed across the address space of LLC 520. Thus, when requesting physically contiguous addresses, a storage application having pages cached within LLC 520 can also have pages 533 span over a hashed sampling of slices, with a generally uniform usage of all slices or a selected subset of slices. This can help to distribute transaction buffers over all of the slices of LLC 520 for performance increases as well as ensuring an even use of the requested cache space to limit or prevent evictions from using too much of one particular slice versus another slice. Transaction buffers 534 can also be arranged to have contiguous addresses within each transaction buffer. Due to the request of physically contiguous addresses for each page, the individual transaction buffers can be assured to have physically contiguous addresses as well.

LLC 520 can thus be divided into different logical "ways" which can be allotted to service general operation of CPU 510 and various functions of the DDIO portions (i.e., for a storage application). The ratio, proportion, or allocation of the entire cache space of LLC 520 can be selected to be apportioned among these ways to provide performance enhancements for storage transactions, functions of storage applications, network interface operations, and storage drive buffering.

The allocation of LLC 520 can be denoted in a granularity of cache ways, N. Thus, LLC 520 can comprise an N-way associative cache structure. A storage application can tune the number of store-and-forward transaction buffers and corresponding physical addresses in such a way that the transaction buffers only use 'M' of the N-way associativity of each set, where M<N, and the CPU cores use 'P' ways of the N-way structure. A storage application can limit instructions and application data to the complement N-M ways, thus ensuring no cache thrashing. A storage application can monitor various system metrics like number of incoming storage transactions (I/Os) to the storage system, size of I/Os, memory bandwidth utilization, or other metrics, and dynamically scale M to maximize LLC utilization. Another example, can scale M dynamically such that main system memory bandwidth is minimized, indicating that cache evictions are minimized for both CPU 510 and storage transaction buffering.

The dynamic allocation of portions of LLC 520 can modify a size of each transaction buffer or a quantity of transaction buffers, among other adjustments. These adjustments can affect the quantity of LLC 520 available to CPU 510 and to the transaction buffers. For examples where a fixed quantity of transaction buffers is employed (e.g., 32 transaction buffers per storage drive, 24 storage drives), changing a per-buffer size can affect the overall allocation of LLC 520 to transaction buffers. Increasing transaction buffer sizes, such as from 32 KB buffer sizes to 64 KB buffer sizes, can increase a transactional efficiency for the storage drives. However, too large of buffer sizes can reduce performance of CPU 510 in general, leading to less cache space for CPU operations and more evictions/thrashing for CPU 510. Conversely, reducing transaction buffer sizes, such as from 32 KB buffer sizes to 16 KB buffer sizes, can increase performance for CPU 510, by allocating less overall space in LLC 520 for storage transactions. However, reduced transaction buffer sizes can consequently reduce transactional efficiency for the storage drives, due in part to more transactions needed to move the same amount of storage data and potentially more evictions of buffered data to main system memory. Thus, a selected allocation is determined based on the operational metrics. This selected allocation can bias performance for CPU 510 or storage transactions, or can be selected to balance performance among the two purposes.

Figure 6:
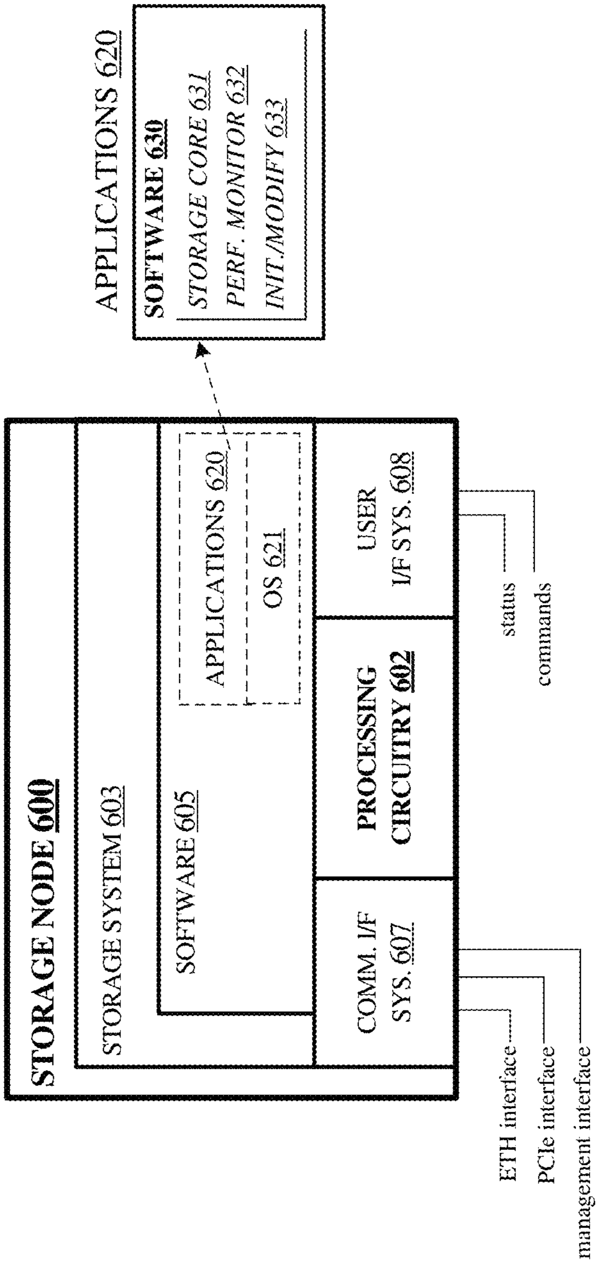
FIG. 6 illustrates an example storage node for a storage environment in an implementation.

FIG. 6 illustrates an example storage node 600 for a storage cluster, system, or storage environment in an implementation. Storage node 600 includes processing circuitry 602, storage system 603, software 605, communication interface system 607, and user interface system 608. Storage node 600 illustrates an example of portions of any of the host nodes, storage controllers, storage shelves, storage nodes, nodes that execute storage applications, IOMs, cache control elements, storage fabric control elements, or other elements discussed herein, such as portions of storage shelf 120 or IOMs 121-122 in FIG. 1, or storage node 305 or CPU 310 in FIG. 3.

Storage node 600 can represent a computing system with which at least software 605 is deployed and executed in order to render or otherwise implement the operations described herein. However, storage node 600 can also represent any computing system on which at least software 605 and associated data can be staged and from where software 605 and data can be distributed, transported, downloaded, or otherwise provided to another computing system for deployment and execution, or for additional distribution.

Processing circuitry 602 can be implemented within a single processing device but can also be distributed across multiple processing devices or sub-systems that cooperate in executing program instructions. Examples of processing circuitry 602 include general purpose central processing units, microprocessors, application specific processors, and logic devices, as well as any other type of processing device. In some examples, processing circuitry 602 includes physically distributed processing devices, such as cloud computing systems.

Communication interface system 607 includes one or more communication and network interfaces for communicating over communication fabrics, communication links, or communication networks, such as point-to-point links, packet networks, the Internet, and the like. Communication interfaces can include one or more Ethernet interfaces or PCIe interfaces, or one or more network or fabric communication interfaces which can communicate over Ethernet, Internet protocol (IP), PCIe, NVMe, or any of the various communication links and protocols discussed herein. Communication interface system 607 can include network interfaces configured to communicate using one or more network addresses, which can be associated with different network links. Examples of communication interface system 607 include network interface card equipment, transceivers, modems, and other communication circuitry.

Storage system 603 can comprise a non-transitory data storage system, although variations are possible. Storage system 603 can comprise any storage media readable by processing circuitry 602 and capable of storing software. Storage system 603 can include volatile and nonvolatile media, removable and non-removable media, implemented in any method or technology for storage of information, such as computer readable instructions, data structures, program modules, or other data. Storage system 603 can include non-volatile storage media, such as solid-state storage media, flash memory, phase change memory, or magnetic memory, including combinations thereof. Storage system 603 can be implemented as a single storage device but can also be implemented across multiple storage devices or sub-systems. Storage system 603 can comprise additional elements, such as controllers, capable of communicating with processing circuitry 602. Storage system 603 can also include main system memory, such as RAM or DRAM, and one or more levels of cache memory, such as L1, L2, or L3 cache memory, of which a layer can be designated as the last level cache (LLC).

Software stored by storage system 603 can comprise computer program instructions, firmware, or some other form of machine-readable processing instructions having processes that when executed a processing system direct storage node 600 to operate as described herein. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

Software 605 includes applications 620 and operating system (OS) 622. Software elements 630 each comprise executable instructions which can be executed by processing circuitry 602 for operating according to the operations discussed herein. For example, when implementing at least a portion of a host node, software 605 can drive processing circuitry 602 to receive storage transactions transferred by multiple clients and transfer the storage transactions for handling by a storage controller in a storage shelf containing storage drives, initiate storage transaction buffering in LLC structures of processing circuitry 602, handle reads/writes in a store-and-forward architecture through the transaction buffers within the LLC, monitor operation of the LLC, storage transactions, and processing circuitry 602 to modify allocations of the LLC, among other operations. When implementing portions of an IOM or storage controller, software 605 can drive processing circuitry 602 to handle storage operations with respect to a set of assigned storage drives, manage such storage drives, and perform various LLC buffering operations with respect to nodes, as discussed herein, among other operations.

In FIG. 6, examples of software elements 630 can implement a storage application, which can include storage core module 631, performance monitor 632, and transaction buffer initialization and modification module 633.

Storage core module 631 can communicate with client nodes/devices over various communication links, such as to receive storage transactions and deliver requested data within a storage cluster. Storage core module 631 can communicate with storage drives of a storage shelf to manage such storage drives, distribute storage transactions to the storage drives, and deliver requested data to a storge host. Storage core module 631 can also establish various logical arrangements of storage resources, assign network- or fabric-routable addressing to such resources, and perform various storage cluster management functions.

Performance monitor 632 can monitor performance metrics related to the storage transactions and performance metrics related to CPU operation, cache operation, storage application operation, and other metrics. Performance monitor 632 can establish various operational thresholds for the various metrics. Based on these thresholds, performance monitor 632 can trigger adjustments or changes to the allocations of a LLC with respect to CPU cores or transaction buffers, among other allocations.

Transaction buffer initialization and modification module 633 can request pages from an LLC, each page having physically contiguous space for buffering storage transactions issued for a set of storage drives managed by storage core module 631. Module 633 can establish sets of transaction buffers assigned to each of the storage drives having an initial buffer size corresponding to sizes of the storage transactions. Based at least on monitored performance metrics related to the storage transactions, module 633 can adjust transaction buffers established within the pages that service each of the storage drives to modify a proportion of the LLC allotted among the transaction buffers and the processor.

User interface system 608 can be optionally employed to accept commands to manage, select, and alter operational configurations of a storage cluster or system, as well as provide operational status, telemetry, and updates for various elements of a storage cluster or system. User interface system 608 can comprise software-based interfaces or hardware-based interfaces. Hardware-based interfaces include touchscreen, keyboard, mouse, voice input device, audio input device, or other touch input device for receiving input from a user. Output devices such as a display, speakers, web interfaces, terminal interfaces, and other types of output devices may also be included in user interface system 608. User interface system 608 can provide output and receive input over a network interface, such as communication interface system 607. In network examples, user interface system 608 might packetize display or graphics data for remote display by a display system or computing system coupled over one or more network interfaces. Physical or logical elements of user interface system 608 can provide alerts or visual outputs to users or other operators. User interface system 608 may also include associated user interface software executable by processing circuitry 602 in support of the various user input and output devices discussed above. Separately or in conjunction with each other and other hardware and software elements, the user interface software and user interface devices may support a graphical user interface, a natural user interface, or any other type of user interface. User interface system 608 can present command line interfaces (CLIs), application programming interfaces (APIs), graphical user interfaces (GUIs), representational state transfer (REST) interfaces, RestAPIs, WebSocket interfaces, or other interfaces to one or more users.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosed examples. Those skilled in the art will also appreciate that the features described above can be combined in various ways to form multiple implementations. As a result, the invention is not limited to the specific implementations described above, but only by the claims and their equivalents. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:

requesting pages each having physically contiguous space for buffering storage transactions issued for a set of storage drives managed by a storage application executed by a processor;

establishing space for the pages in a last level cache (LLC) of the processor; and based at least on monitored performance metrics related to the storage transactions, adjusting transaction buffers established within the pages that service each of the storage drives to modify a proportion of the LLC allocated among the transaction buffers and operations of the processor.

2. The method of claim 1, wherein adjusting the transaction buffers comprises adjusting sizes or quantities of the transaction buffers.

3. The method of claim 2, wherein the proportion of the LLC allotted among the transaction buffers is modified to fit the adjusted sizes or quantities to prevent main memory access for buffering the storage transactions.

4. The method of claim 2, wherein the adjusted sizes or quantities are selected to increase performance for the storage transactions relative to a present performance of the storage transactions.

5. The method of claim 1, wherein the performance metrics comprise at least one among eviction rates of data corresponding to the storage transactions, cache thrashing for the processor, main memory bandwidth utilization rates, quantities of storage transactions, or sizes of the storage transactions.

6. The method of claim 1, wherein the pages comprise physically contiguous addresses selected to fit within the LLC and are spread over more than one slice of the LLC according to a slice distribution function of the processor; and wherein the transaction buffers are spread over more than one slice of the LLC according to the distribution function of the processor and comprise physically contiguous address subsets within the pages.

7. The method of claim 6, wherein the physically contiguous addresses for the pages and the physically contiguous address subsets for the transaction buffers are selected to obtain a spread generally uniformly among the cache slices.

8. The method of claim 1, comprising:

within the pages, establishing sets of transaction buffers assigned to each of the storage drives and having an initial buffer size corresponding to present sizes of the storage transactions.

9. The method of claim 1, comprising:

in the storage application, responsive to an indication of a write transaction initiated by a remote node over a network link and directed to a selected storage drive:

performing a remote direct memory access read operation over the network link to transfer write data for the write transaction from the remote node into a set of the transaction buffers in the LLC designated to service the write transaction;

initiating a write operation to the selected storage drive comprising a direct memory access read operation of the write data from the set of the transaction buffers into the storage drive; and releasing the set of transaction buffers for use in other storage transactions.

10. The method of claim 1, comprising:

in the storage application, responsive to an indication of a read transaction initiated by a remote node over a network link and directed to a selected storage drive:

transferring a read operation to the selected storage drive corresponding to the read operation, wherein the selected storage drive performs a direct memory access write operation into a set of the transaction buffers in the LLC designated to service the read transaction;

performing a remote direct memory access write operation over the network link to transfer read data for the read transaction from the set of the transaction buffers into the remote node; and releasing the set of transaction buffers for use in other storage transactions.

11. The method of claim 1, comprising:

establishing the space for the pages in the LLC and modifying the proportion of the LLC allotted among the transaction buffers and the processor by at least using a Data Direct I/O (DDIO) function of the processor.

12. An apparatus, comprising:

one or more non-transitory computer readable storage media; and program instructions stored on the one or more non-transitory computer readable storage media that, based on being executed by a processing system, direct the processing system to at least:

request pages each having physically contiguous address space for buffering storage transactions issued for a set of storage drives managed by a storage application;

establish space for the pages in a last level cache (LLC) associated with a processor; and adjust one or more transaction buffers established within the pages to modify allocation of the LLC among the transaction buffers to prevent main memory access for buffering the storage transactions.

13. The apparatus of claim 12, comprising further program instructions that, based on being executed by the processing system, direct the processing system to at least:

adjust the one or more transaction buffers by at least adjusting sizes or quantities of the one or more transaction buffers based at least on monitored performance metrics related to the storage transactions; and wherein the adjusted sizes or quantities are selected to prevent the main memory access for buffering the storage transactions.

14. The apparatus of claim 12, wherein the pages are spread over more than one slice of the LLC according to a slice distribution function of the processor; and wherein the transaction buffers are spread over more than one slice of the LLC according to the distribution function of the processor and comprise physically contiguous address subsets within the pages.

15. The apparatus of claim 12, comprising further program instructions that, based on being executed by the processing system, direct the processing system to at least:

within the pages, establish sets of transaction buffers assigned to each of the storage drives and having an initial buffer size corresponding to present sizes of the storage transactions.

16. The apparatus of claim 12, comprising further program instructions that, based on being executed by the processing system, direct the processing system to at least:

the storage application configured to, responsive to an indication of a write transaction initiated by a remote node over a network link and directed to a selected storage drive:

perform a remote direct memory access read operation over the network link to transfer write data for the write transaction from the remote node into a set of the transaction buffers in the LLC designated to service the write transaction;

initiate a write operation to the selected storage drive comprising a direct memory access read operation of the write data from the set of the transaction buffers into the storage drive; and release the set of transaction buffers for use in other storage transactions.

17. The apparatus of claim 12, comprising further program instructions that, based on being executed by the processing system, direct the processing system to at least:

the storage application configured to, responsive to an indication of a read transaction initiated by a remote node over a network link and directed to a selected storage drive:

transfer a read operation to the selected storage drive corresponding to the read operation, wherein the selected storage drive performs a direct memory access write operation into a set of the transaction buffers in the LLC designated to service the read transaction;

perform a remote direct memory access write operation over the network link to transfer read data for the read transaction from the set of the transaction buffers into the remote node; and release the set of transaction buffers for use in other storage transactions.

18. The apparatus of claim 12, comprising further program instructions that, based on being executed by the processing system, direct the processing system to at least:

establish the space for the pages in the LLC and modify the proportion of the LLC allotted among the transaction buffers and the processor by at least using a Data Direct I/O (DDIO) function of the processor.

19. A storage system, comprising:

a processor associated with a last level cache (LLC);

a storage application executed by the processor and configured to:

request pages for transaction buffers that service storage transactions issued for a set of storage drives managed by the storage application;

establish space for the pages in the LLC using a Data Direct I/O (DDIO) function of the processor; and dynamically adjust properties one or more transaction buffers established within the pages to modify a proportion of the LLC allocated among the transaction buffers and operations of the processor.

20. The storage system of claim 19, comprising:

the storage application configured to adjust the properties of the one or more transaction buffers by at least adjusting sizes or quantities of the one or more transaction buffers based at least on monitored performance metrics related to the storage transactions; and wherein the adjusted sizes or quantities are selected to prevent main memory access for buffering the storage transactions.

* * * * *